US007818008B2

(12) United States Patent
Kalavade

(10) Patent No.: US 7,818,008 B2
(45) Date of Patent: Oct. 19, 2010

(54) MOBILE SERVICES CONTROL PLATFORM PROVIDING A CONVERGED VOICE SERVICE

(75) Inventor: Asawaree Kalavade, Stow, MA (US)

(73) Assignee: Tatara Systems, Inc., Acton, MA (US)

( * ) Notice: Subject to any disclaimer, the term of this patent is extended or adjusted under 35 U.S.C. 154(b) by 0 days.

(21) Appl. No.: 11/598,287

(22) Filed: Nov. 13, 2006

(65) Prior Publication Data

US 2007/0060124 A1 Mar. 15, 2007

Related U.S. Application Data

(63) Continuation of application No. 11/214,172, filed on Aug. 29, 2005, now Pat. No. 7,136,651.

(60) Provisional application No. 60/605,613, filed on Aug. 30, 2004.

(51) Int. Cl.
*H04W 40/00* (2009.01)
(52) U.S. Cl. ............................................ 455/445
(58) Field of Classification Search .................. 455/445, 455/552.1, 556.1, 432.1, 432.2
See application file for complete search history.

(56) References Cited

U.S. PATENT DOCUMENTS

| | | | |
|---|---|---|---|
| 5,347,272 | A | 9/1994 | Ota |
| 6,487,602 | B1 | 11/2002 | Thakker |
| 6,801,781 | B1 | 10/2004 | Provost et al. |
| 6,912,389 | B2 | 6/2005 | Bright et al. |
| 6,950,876 | B2 * | 9/2005 | Bright et al. ............... 709/230 |
| 7,136,651 | B2 * | 11/2006 | Kalavade ................... 455/445 |
| 7,453,856 | B2 * | 11/2008 | Guey ........................ 370/336 |
| 7,496,652 | B2 * | 2/2009 | Pezzutti ..................... 709/223 |
| 7,522,632 | B2 * | 4/2009 | La Porta et al. ............ 370/466 |
| 7,613,171 | B2 * | 11/2009 | Zehavi et al. .............. 370/352 |
| 2003/0197607 | A1 * | 10/2003 | Striemer .................. 340/539.1 |
| 2003/0224795 | A1 | 12/2003 | Wilhoite et al. |
| 2005/0002407 | A1 | 1/2005 | Shaheen et al. |
| 2005/0254469 | A1 | 11/2005 | Verma et al. |

OTHER PUBLICATIONS

Author Unknown, "3GPP TS 23.234 V6.0.0", Technical Specification Group Services and System Aspects; 3GPP system to Wireless Local Area Network (WLAN), Interworking System description, Mar. 2004, 83 ppgs.
Author Unknown, "3GPP TS 23.008 V7.0.0", Technical Specification Group Core Network and Terminals, Organization of subscriber data, Dec. 2005, 72 ppgs.

* cited by examiner

*Primary Examiner*—Lester Kincaid
*Assistant Examiner*—Nathan Mitchell
(74) *Attorney, Agent, or Firm*—Fulbright & Jaworski L.L.P.

(57) ABSTRACT

A mobile services control platform supports an enhanced service, Voice Forwarding to Wi-Fi or Wi-Fi Voice. Functionally, the service allows a subscriber to use a Wi-Fi device to receive voice calls directed to his or her mobile number. In a representative example, when the user connects over a Wi-Fi network, e.g., using his or her laptop or other such device, he or she selects "Wi-Fi Voice" option from a client. As a result, future voice calls directed to the user's mobile number get routed to his or her laptop over Wi-Fi, without the caller being aware that the user has connected over a different network. Similarly, voice calls made by the user from his or her laptop Wi-Fi (e.g., through a softphone) are delivered to the recipient's device as if they originated from the mobile phone number.

4 Claims, 15 Drawing Sheets

1. GSM CALL ESTABLISHED
2. WLAN AUTHENTICATION, REGISTRATION
3. WLAN CALL LEG ESTABLISHED
4. GSM CALL LEG DISCONNECTED

MOBILE SERVICES CONTROL PLATFORM PROVIDING A CONVERGED VOICE SERVICE

This application is a continuation of Ser. No. 11/214,172, filed Aug. 29, 2005 now U.S. Pat. No. 7,136,651, which application was based on Ser. No. 60/605,613, filed Aug. 30, 2004.

CROSS-REFERENCE TO RELATED APPLICATION

This application is related to U.S. Ser. No. 11/157,498, filed Jun. 21, 2005, titled MOBILE SERVICES CONTROL PLATFORM PROVIDING A MESSAGE FORWARDING SERVICE.

BACKGROUND OF THE INVENTION

1. Technical Field

The present invention relates generally to WAN mobility technologies and services.

2. Description of the Related Art

A mobile services control platform (MSCP) enables service providers to offer a range of services on mobile computing devices, such as laptops, PDAs, and smart phones. A representative mobile services control platform is described in commonly-owned, co-pending application Ser. No. 10/871,413, titled "Wi-Fi Service Delivery Platform for Retail Service Providers," filed Jun. 18, 2004. As described in that application, the mobile services control platform enables service providers to enhance their existing wireless data offerings to include access over new networks (such as Wi-Fi) and new devices (such as laptops and PDAs), while still being part of a single subscriber profile. This enables service providers to offer to their existing subscribers a single account and single bill for all wireless services.

A representative mobile services control platform is available commercially from Tatara Systems, Inc. of Acton, Mass. This platform comprises a centrally deployed gateway server working in conjunction with a client component on a subscriber's mobile computing device. The client and server maintain a real-time, secure and bi-directional control channel that runs across any IP network. This architecture enables service providers to build their brands, maintain ownership of their customers and extend access to their IP-based services across multiple "home" and "roaming" access networks. The real-time, secure control channel allows service providers to securely authenticate customers, to collect diagnostic information in real-time from the user's device, to monitor and manage service level agreements (SLAs) with roaming partners, to support a broad range of pricing and payment options, and to deliver integrated converged mobile services.

It would be desirable to extend the functionality of a mobile services control platform to provide a converged voice experience, regardless of the device or network. The present invention addresses this need in the art.

BRIEF SUMMARY OF THE INVENTION

The present invention is directed to a method of and apparatus for enabling a Wi-Fi-enabled device user to send and receive voice calls directed to his or her mobile number. The "one number voice" functionality preferably is implemented within a converged networking operating environment wherein a gateway is deployed in a service provider's telecommunications network and client software is embedded in a subscriber mobile device that is operable within both the telecommunications network and a wireless local area network to which the subscriber mobile device is connectable. In one embodiment, the service provider's telecommunications network comprises an VOIP infrastructure (typically, a set of one or more network elements such as a SIP server, a signaling gateway (SGW), a Media Gateway Control Function (MGCF) and a Media Gateway (MGW)), and a database (e.g., an HLR) to which a subscriber's identity is assigned. Preferably, a secure connection link is established between the client software and the gateway. The method begins by updating data message routing information in the database to identify the gateway as a location of the subscriber mobile device. In a representative embodiment, this step configures the gateway as an MSC/VLR. Once the gateway is configured in this manner, voice calls intended for the subscriber are routed seamlessly to the subscriber mobile device, and voice calls originated by the subscriber are routed seamlessly from the subscriber mobile device.

Thus, according to the present invention, a mobile services control platform supports an enhanced service, Voice Forwarding to Wi-Fi or Wi-Fi Voice. Functionally, and as noted above, the service allows a subscriber to use a Wi-Fi device to receive voice calls directed to his or her mobile number. In a representative example, when the user connects over a Wi-Fi network, e.g., using his or her laptop or other such device, he or she selects "Wi-Fi Voice" option from a client. As a result, future voice calls directed to the user's mobile number get routed to his or her laptop over Wi-Fi, without the caller being aware that the user has connected over a different network. Similarly, voice calls made by the user from his or her laptop Wi-Fi (e.g., through a softphone) are delivered to the recipient's device as if they originated from the mobile phone number.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

As noted above, the present invention may be implemented in a converged networking environment wherein a gateway is deployed in a service provider's telecommunications network and client software is embedded in a subscriber mobile device that is operable within both the telecommunications network and a wireless local area network to which the subscriber mobile device is connectable. As noted above, the present invention is not limited for use with any particular voice telecommunications network, protocol or technology. For illustrative purposes only, the following describes the invention in the context of a GSM network as a representative service provider's networking environment. The invention may likewise be implemented in a CDMA networking environment, or in or across other known or later-developed environments in which voice forwarding is desired. Moreover, while one embodiment of the present invention is illustrated in the context of providing voice forwarding over Wi-Fi, this is not a limitation of the invention either, as the functionality may be implemented to provide voice forwarding to any IP-based network.

Figure 1:
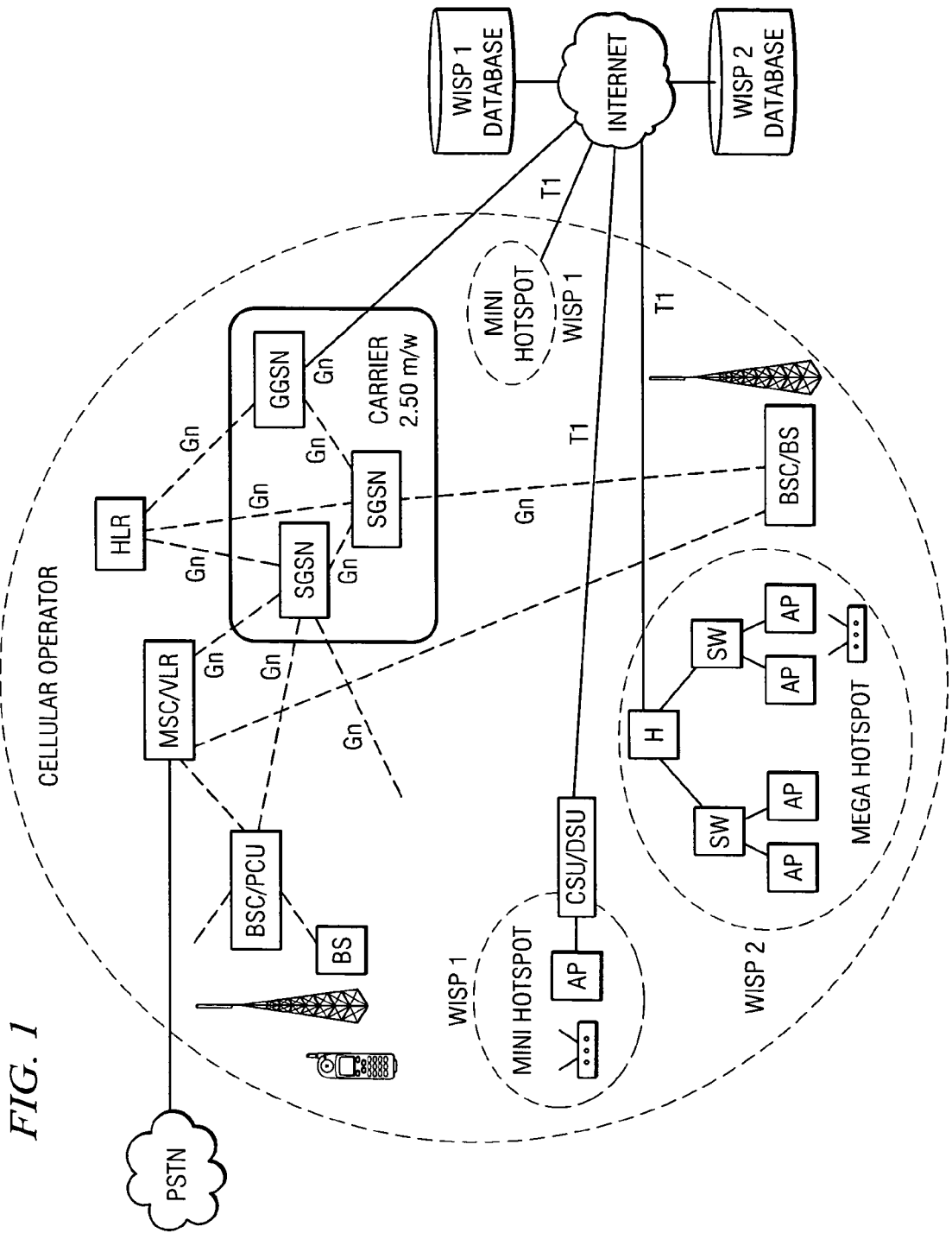
FIG. 1 is a simplified block diagram of a converged networking operating environment comprising a service provider's telecommunications network and a wireless local area network to which a subscriber mobile device is connectable.

As is well-known, a network 10 (such as a GSM network) comprises a number of basic components such as illustrated in FIG. 1. They include a mobile switching center (MSC) 12, which is an enhanced ISDN switch that is responsible for call handling of mobile subscribers. A visitor location register (VLR) 14 is an intelligent database that stores on a temporary basis data required to handle calls set up or received by mobile stations 16 registered with the VLR. The VLR also controls certain services associated with outgoing calls. The MSC and VLR may be separate entities or implemented as a single unit. The home location register (HLR) 18 is an intelligent database, which is responsible for management of each subscriber's records. The HLR also controls certain services associated with incoming calls. Each mobile station 16 is the physical equipment used by a subscriber. The mobile station includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). More generally, a mobile station is a wireless client device having a dual mode interface, namely, a WLAN interface and a WAN interface. The WLAN interface provides Wi-Fi support, Wi-Max support or, more generally, connectivity to an IP-based network. The WAN interface provides GSM support, CDMA support, or the like, depending on the underlying telecommunication network and protocol. Representative wireless client devices include, without limitation, a laptop, or a PDA with a GPRS NIC. Mobile stations connect to a base station (BS) 28, which provides radio coverage within a cell. Multiple base stations 28 connect into base station controller (BSC) 30, which is a small switch that acts as a local concentrator of traffic and provides local switching to effect handover between base stations. Voice traffic is sent from the BSC 30 to the mobile station. A packet control unit (PCU) 32 installed at the BSC 30 separates data traffic coming from a mobile station. The data traffic is managed by the operator's wireless data network. In particular, the data traffic goes to a Serving GPRS Service Node (SGSN) 34. A carrier's network typically has multiple SGSNs. The SGSNs authenticate mobile users by querying an HLR 18. The SGSN 34 is also responsible for managing traffic, and it routes data traffic over the carrier's GPRS network to a Gateway GPRS Service Node (GGSN) 36. The GGSN 36 is a border router that routes traffic to and from the GPRS network into the public Internet. As a user moves across cells, the user becomes associated with different SGSNs. The SGSNs are responsible for managing the mobility of the user.

The network architecture for a wireless local area network 38 is also illustrated in FIG. 1. A typical wireless LAN is deployed as a "hotspot" where mobile device users are expected to frequent such as, e.g., at an airport, a convention center, a local retail shop, and the like. Hotspots are often classified into two general categories: mini hotspots and mega hotspots. A mini hotspot is a relatively small deployment such as, e.g., in a retail shop. A mini hotspot deployment typically comprises a single wireless LAN 802.11 based access point (AP) 40 and provides connectivity into the Internet typically over a DSL, T1, or a leased line. A mega hotspot is a deployment that supports a set of access points and covers a moderate sized area such as, e.g., a convention center. Such a deployment typically has multiple APs connected through Ethernet switches and a router to the public Internet typically over a T1 or a leased line. The hotspots are typically managed and operated by wireless ISP's (WISP) or wireless system integrators. Users with laptops or PDA's with 802.11 based network interface cards (NIC's) use the 802.11 wireless network to access the Internet.

Figure 2:
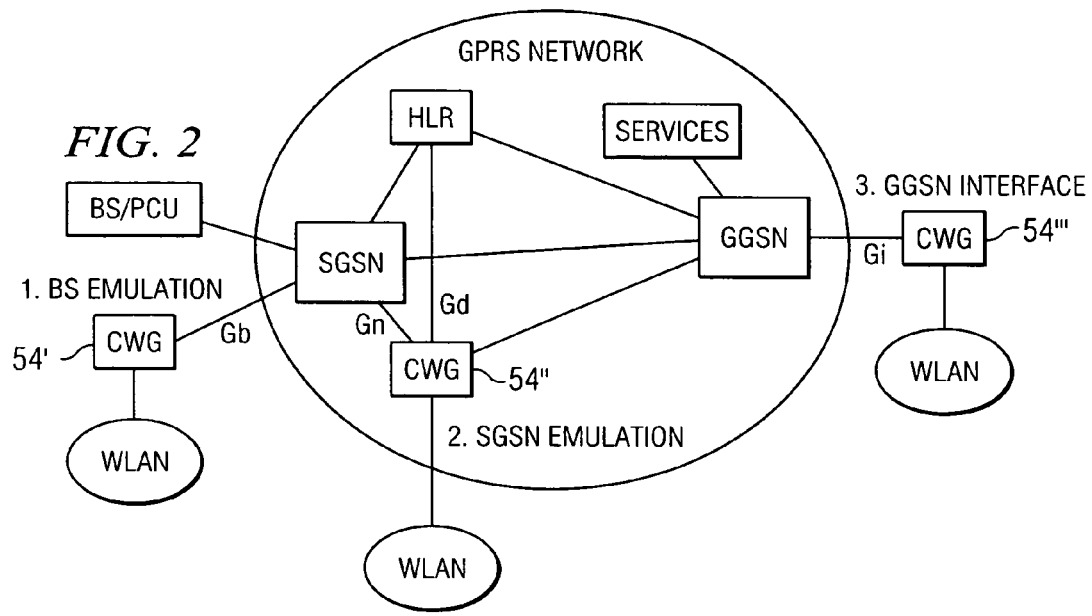
FIG. 2 illustrates various ways in which the gateway and its corresponding client component may be implemented to provide a converged networking operating environment.

FIG. 2 illustrates a converged networking environment that integrates a WLAN 50 and a WAN 52 as described in commonly-owned, co-pending application Ser. No. 10/213,329. The present invention may be implemented in this environment. In these embodiments, convergence is achieved using a CWG 54 and a CWG client 56. The CWG 54 is a gateway between the wireless LAN 50 and the GPRS network 52. The CWG 54 can be deployed in multiple ways by emulating different interfaces within the GPRS network 52. A CWG 54' can be deployed, e.g., by emulating a base station/packet control unit (BS/PCU) and connecting to the SGSN 19 within the GPRS network. In this way, the CWG 54' makes a wireless LAN hotspot look like a GPRS cell to the SGSN. To accomplish this, the CWG emulates several functions within the mobile station, the BS, and the PCU. By masquerading as a GPRS cell, this design enables the wireless LAN cell to leverage several key features and functionalities within the GPRS network. In particular, the WLAN leverages the authentication and mobility management capabilities of the SGSN. Alternatively, a CWG 54" can be deployed by emulating a SGSN and by connecting to the GGSN 22 and other SGSNs 18 in the GPRS network. From the GPRS network perspective, the CWG 54" looks like a SGSN, while from the LAN side, the CWG looks like a LAN interface. In this approach, the CWG emulates the SGSN and leverages the mobility management infrastructure of the GPRS network. As a further alternative, a CWG 54" is deployed as a GGSN interface. In this approach, the CWG connects to the GGSN 22 from the external side, as against the GPRS network side. In this case, the CWG is a gateway that connects to the GGSN and leverages authentication infrastructure within the GPRS network.

A CWG client 56 is installed on the mobile station. The client software can include information downloaded by the operator when the user first subscribes to hotspot access. The client is responsible for conveying identification information as well as for assisting in traffic and mobility management. As described in Ser. No. 10/213,329, the client software is generally needed to provide session and traffic integration and is optional if only AAA integration is desired. If present, however, the client software communicates with the CWG to authenticate the user with the GPRS network.

The CWG gateway and client comprise a mobile services control platform. The gateway preferably is disposed within a mobile operator's backend network working in conjunction with a client component on the subscriber's mobile computing device. The client and server components maintain a real-time, secure and bi-directional communications channel that runs across any IP network. This architecture enables service providers to build their brands, maintain ownership of their customers, and to extend access to their IP-based services across multiple "home" and "roaming" Wi-Fi access networks. Representative gateway and client components are available from Tatara Systems, Inc. of Acton, Mass.

Figure 3:
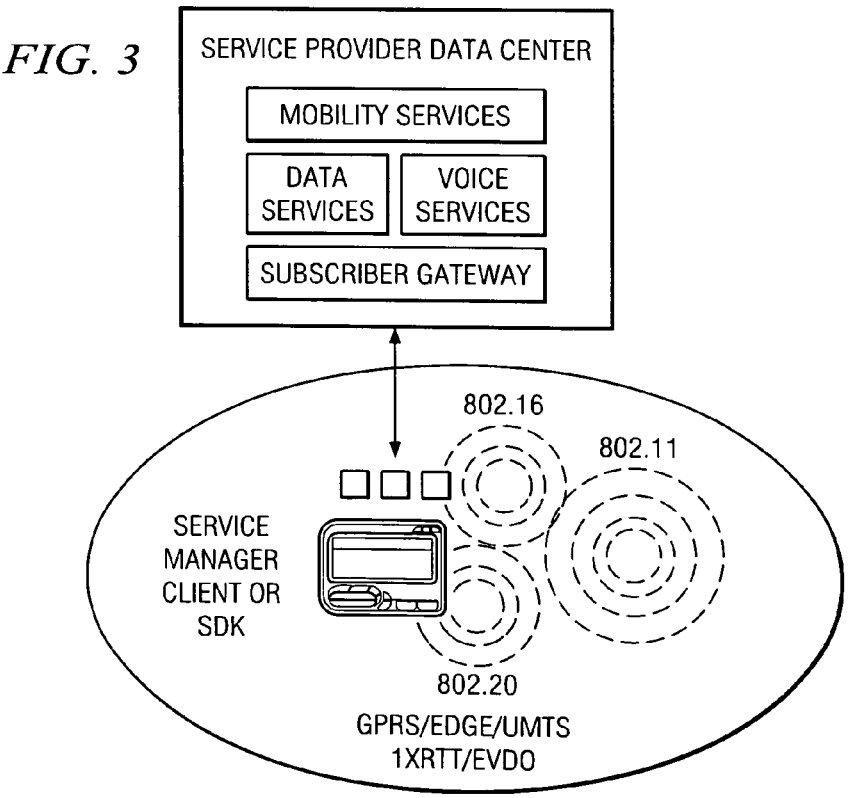
FIG. 3 illustrates a mobile services control platform that provides data mobility services of the present invention.

As noted below and illustrated in FIG. 3, the gateway and its corresponding client component enable access over multiple networks. Specific capabilities include authentication and billing support, enhanced security, real-time customer care and diagnostics, business analytics, client and location management, as well as roaming partner administration, auditing and network management. Additional details regarding these components are provided in commonly-owned co-pending application Ser. No. 10/871,413. According to the present invention, an additional voice forwarding service is deployed using the platform. This "one number voice" function is a "mobility service" as shown in FIG. 3.

The following sections provide details on the converged voice functionality of the present invention.

Figure 4A:
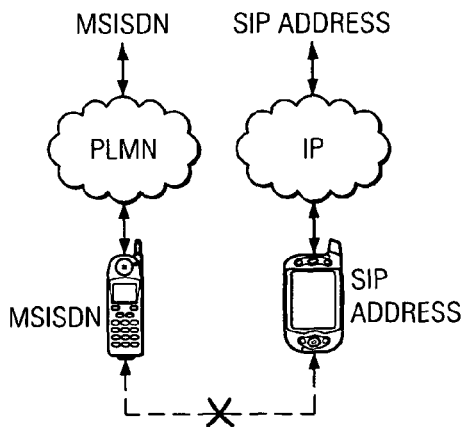
FIG. 4A illustrates a prior art approach.
Figure 4B:
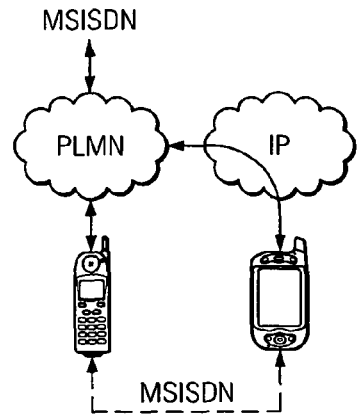
FIG. 4B illustrates the Voice Forwarding to Wi-Fi solution provided by the present invention.

By way of brief additional background, an advantage of the inventive solution is explained by comparing FIGS. 4A and 4B. In a traditional VOIP deployment, the user is addressed by either a SIP identity or a separate phone number associated with the SIP network. This is illustrated in FIG. 4A. In this case, the user has two separate identities, one for mobile voice and one for VOIP. By leveraging the present invention, a "converged" voice service is provided where the user is always reached by his or her mobile phone number—regardless of the network and device. This advantage of this "one number voice" technique is illustrated in FIG. 4B.

To achieve this functionality, the present invention preferably implements a control path solution that integrates the mobile voice network with a SIP VOIP network and, in particular, by providing a gateway that detects a user's Wi-Fi presence and Voice preference, updates a subscriber database (e.g., HLR/HSS in GSM or CDMA networks) with the new presence information, and routes the incoming calls to the VOIP infrastructure. Conceptually, the present invention may be considered to be a SIP/HLR proxy that manages Wi-Fi network presence and call routing functions, while integrating with the existing VOIP infrastructure (either softswitch based or IMS based) to enable delivery of end-to-end voice calls.

As will be described in more detail below, the present invention provides a converged voice service over Wi-Fi with several desirable features: integrated Wi-Fi and voice authentication that enables secure authentication of Wi-Fi users before delivery of voice services; extension of Wi-Fi presence and availability to existing voice infrastructure, enabling routing of mobile voice calls into the Wi-Fi network while maintaining a single user identity that corresponds to the user's mobile phone number; a control and signaling path solution that provides a seamless interface with existing VOIP infrastructure in a service provider network (e.g., Media Gateways, softswitch, or IMS infrastructure); and, standards based interface into SIP and Parlay application services platforms, enabling seamless extension of existing voice services into the Wi-Fi domain.

The present invention provides this functionality in existing softswitch-based networks, as well as with developing IMS infrastructure. Each of these approaches is discussed in detail in the next two sections.

1. Softswitch Network Solution

Figure 5:
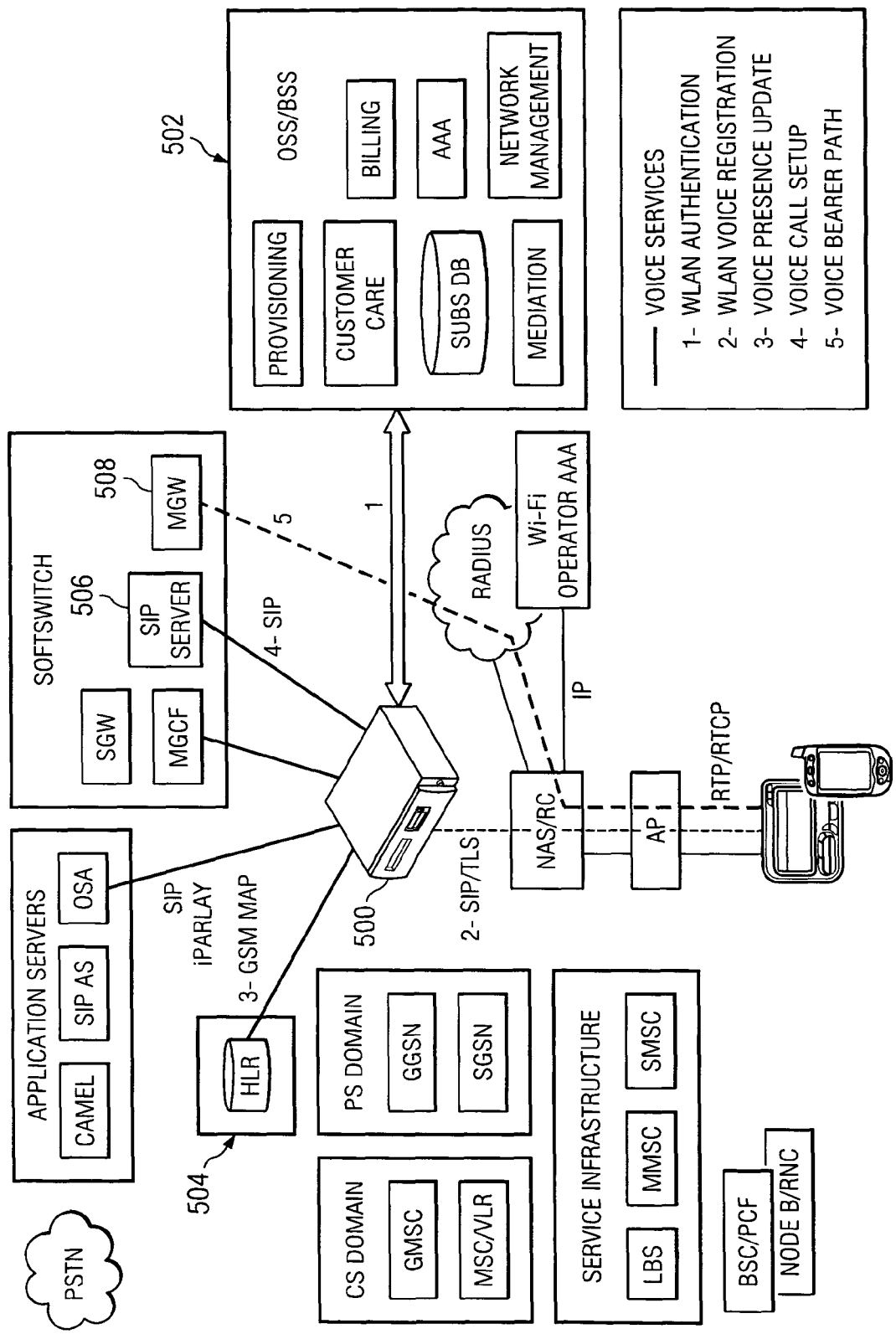
FIG. 5 illustrates how the present invention leverages softswitch-based VOIP deployment architecture to deliver VOIP calls to a Wi-Fi device.

In this embodiment, the present invention leverages softswitch-based VOIP deployment architecture to deliver VOIP calls to the Wi-Fi device. In particular, a subscriber gateway provides the gateway between the two networks via a SIP/HLR proxy, manages authentication, manages presence, and controls signaling. The service manager client serves as the VOIP endpoint, providing a softphone capability. An illustrative architecture is shown in FIG. 5. As illustrated here, the gateway 500 the gateway interfaces with an OSS/BSS infrastructure 502 to provide an AAA functionality as specified by 3GPP WLAN AAA Server. The gateway 500 interfaces with an HLR 504 over GSM MAP protocols for authentication and location management. The gateway 500 also interfaces with softswitch components, including SIP servers 506 and media gateways 508 to deliver VOIP signaling and bearer traffic. The client supports AAA functions and also has SIP functionality. The gateway and client communicate over a secure channel, which enables delivery of voice sessions even when the user runs a VPN.

Figure 6:
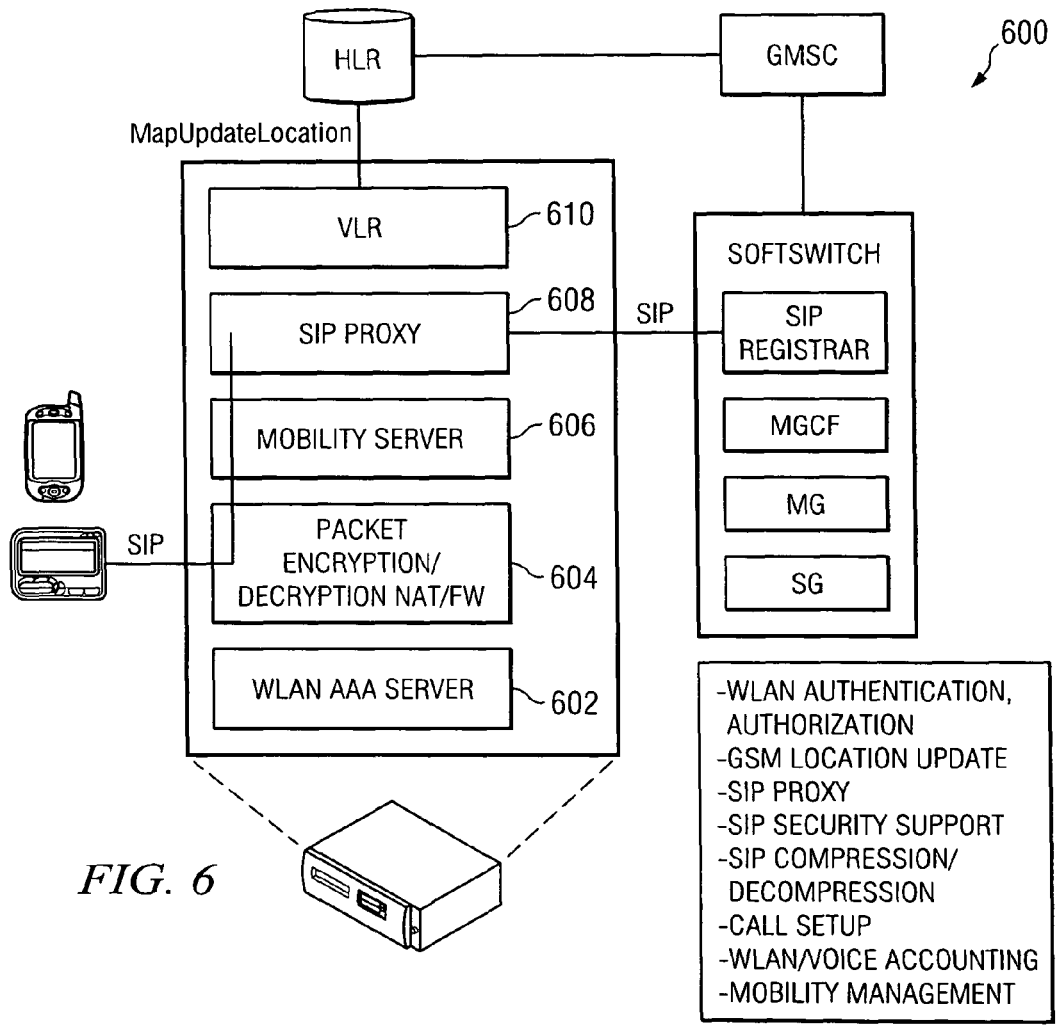
FIG. 6 is a simplified block diagram illustrating a set of software modules that comprise the subscriber gateway according to a first embodiment of the invention.

FIG. 6 provides additional details regarding the functional architecture within the subscriber gateway. The gateway 600 comprises the following modules.

WLAN AAA Server 602: This module performs AAA functions required to authenticate users for Wi-Fi access as well as authorize them for voice services. Further, this module also collects session and flow level usage information, which is used for accounting. These operations conform to 3GPP AAA requirements for WLAN.

PDG 604: This module terminates tunnels from the client. These tunnels, which are preferably based on SSL, are used for the transport of SIP signaling messages, as well as for delivery of voice packets. This conforms to the PDG specification as defined by 3GPP. This module serves as a Session Border Controller, managing security and privacy issues as well as NAT/Firewall traversal.

Mobility server 606: This module manages seamless handoffs between GSM and Wi-Fi networks. The approach to mobility management is described in more detail below.

SIP Proxy 608: This module is a stateful SIP proxy that transfers all the SIP messages between the client and the SIP servers in the network.

VLR 610: As noted above, the gateway interfaces with the HLR over GSM MAP, functioning as a VLR. This operation is used to update the user's location to point to Wi-Fi. Specifically, the VLR points the user's voice location to the softswitch. As a result, subsequent calls for the user's mobile number get directed to the softswitch, which then delivers them over Wi-Fi to the user device.

Figure 7:
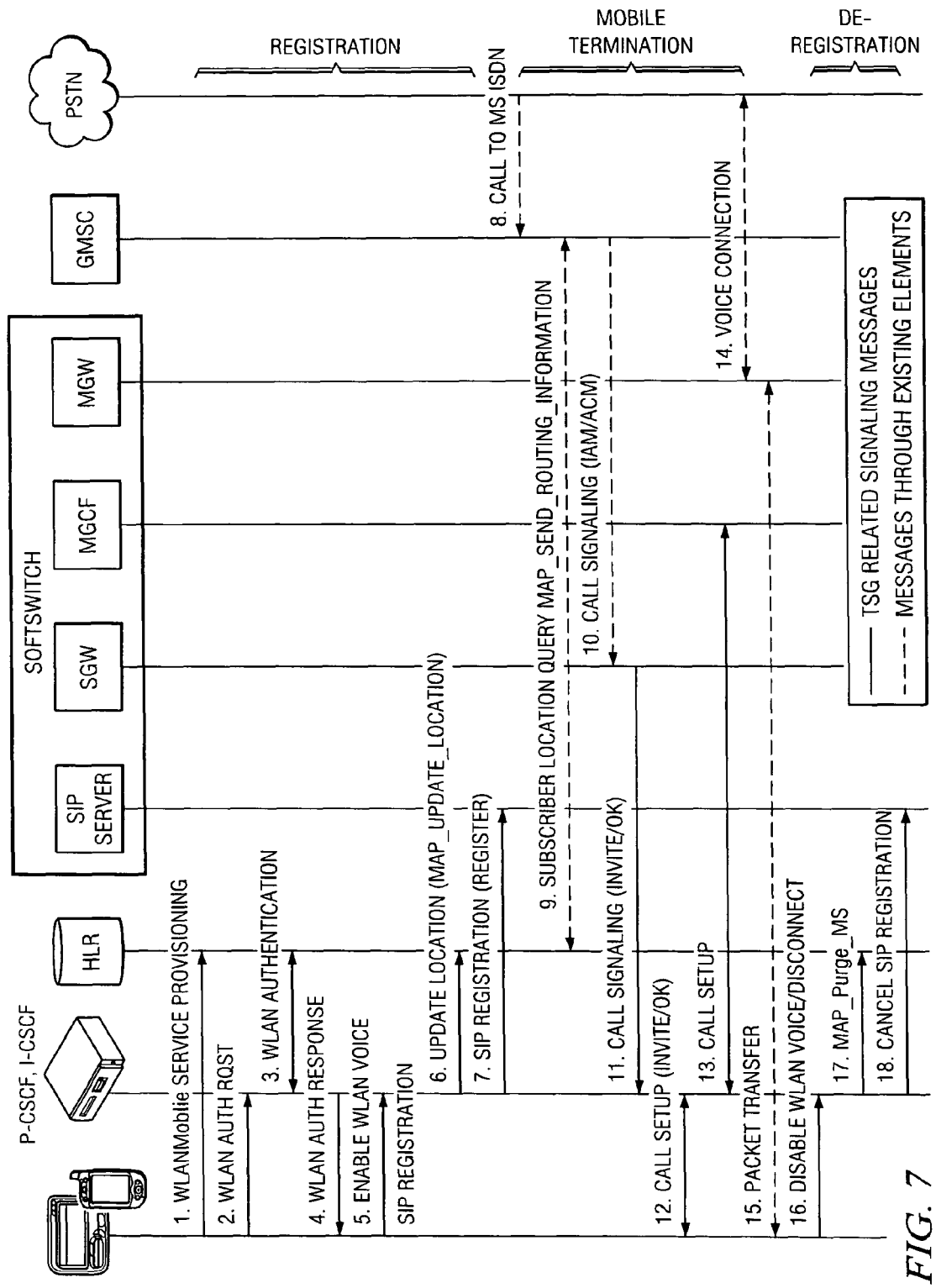
FIG. 7 is a representative call flow for the softswitch-based embodiment in FIGS. 5 and 6.

A representative call flow for this embodiment is shown in FIG. 7 using a GSM network as an example. It should be noted that similar messages can be sent for a CDMA network as well. The call flow is described below.

Registration messages:
1. The user's client is configured with the mobile number and provisioned for Wi-Fi voice services.
2. The client makes an authentication request for Wi-Fi access.
3. The subscriber gateway authenticates the user through one of several Wi-Fi authentication methods, including SIM based authentication.
4. The authentication response is forwarded to the client.
5. When authenticated, the user selects "Wi-Fi voice" option from the client, requesting all future voice calls be routed to Wi-Fi. Alternatively, the Wi-Fi Voice selection can be tied to certain SSIDs or, for example, always enabled when connected from a given network. This policy can be configured through a combination of user and service provider defined preferences. As a response to the user selection, the client sends the "Wi-Fi voice" message to the subscriber gateway, preferably over a secure link. The softphone on the client then sends SIP REGISTER messages to the subscriber gateway (which as noted above functions as a SIP proxy and proxies the messages to the SIP Server as in step 7 below).
6. The gateway updates the user's location in the HLR through GSM MAP location update messages MAP_LOCATION_UPDATE. This ensures that subsequent calls get routed to the VOIP infrastructure. Specifically, the location is updated to point the user's voice calls to the gateway that acts as the VLR for VOIP calls.
7. The gateway functions as a SIP proxy and forwards the SIP REGISTER messages to a SIP Server. Specific details of the SIP/SS7 messages and the role of the gateway within the overall VOIP infrastructure are summarized below.

Mobile Terminated Calls:
8. An incoming call arrives at the GMSC.
9. The GMSC looks up the subscriber location by querying the HLR by using MAP messages such as MAP_SEND_ROUTING_INFORMATION. The HLR queries the gateway, which returns the user location to point to the softswitch.
10. The GMSC sets up the call with the softswitch, e.g., by using a signaling gateway between the SS7 based CS voice network and the SIP based PS voice network. Preferably, the PSTN IAM messages are converted to SIP INVITE messages. Additional details of the messages are shown below.
11. The call signaling is forwarded from the MGCF to the client through the subscriber gateway.
12. The client sets up the call through SIP messages.
13. The call is established with the incoming network.
14. The RTP/RTCP packets then go through the incoming media gateway over to the softphone through the IP network directly.
15. The voice calls continue over the bearer path. When the call is terminated, BYE messages are sent over the SIP network to terminate the call.

Canceling Wi-Fi Voice:
16. When the user de-selects Wi-Fi Voice or disconnects the Wi-Fi session, the client sends a Disable Wi-Fi Voice message to the gateway.
17. The gateway in turn sends a purge (MAP_PURGE_MS) to the HLR to cancel the user's VOIP location so that subsequent calls get directed to the GSM network.

Typically, when the user turns on his or her mobile after the VOIP session, the regular registration messages will redirect calls back to the mobile.

18. The gateway also sends a registration cancellation message to the SIP server to cancel the user's registration in the VOIP network. This is essentially a REGISTER message with expiration time set to zero seconds.

One of ordinary skill in the art will appreciate that an advantage of this approach is that it leverages existing components in a VOIP network. In particular, preferably the gateway is a signaling plane element and functions as a SIP/HLR proxy, integrates with Wi-Fi authentication and billing, controls VOIP signaling messages, manages end-to-end call completion (e.g., by proxying SIP messages), and off-loads bearer path transfers to the media gateways. In addition, specific billing records for Wi-Fi voice usage can also be generated by the subscriber gateway as needed.

2. IMS-Based Network Solution

This approach for voice forwarding takes advantage of the elements deployed in an IMS based infrastructure. As is known, IMS is a next generation all Internet Protocol (IP) core being designed for GSM and CDMA networks. In this context, the gateway is a signaling plane element and functions as a P-CSCF (and optionally as an I-CSCF) to provide the necessary integration with Wi-Fi authentication and billing infrastructure.

Figure 8:
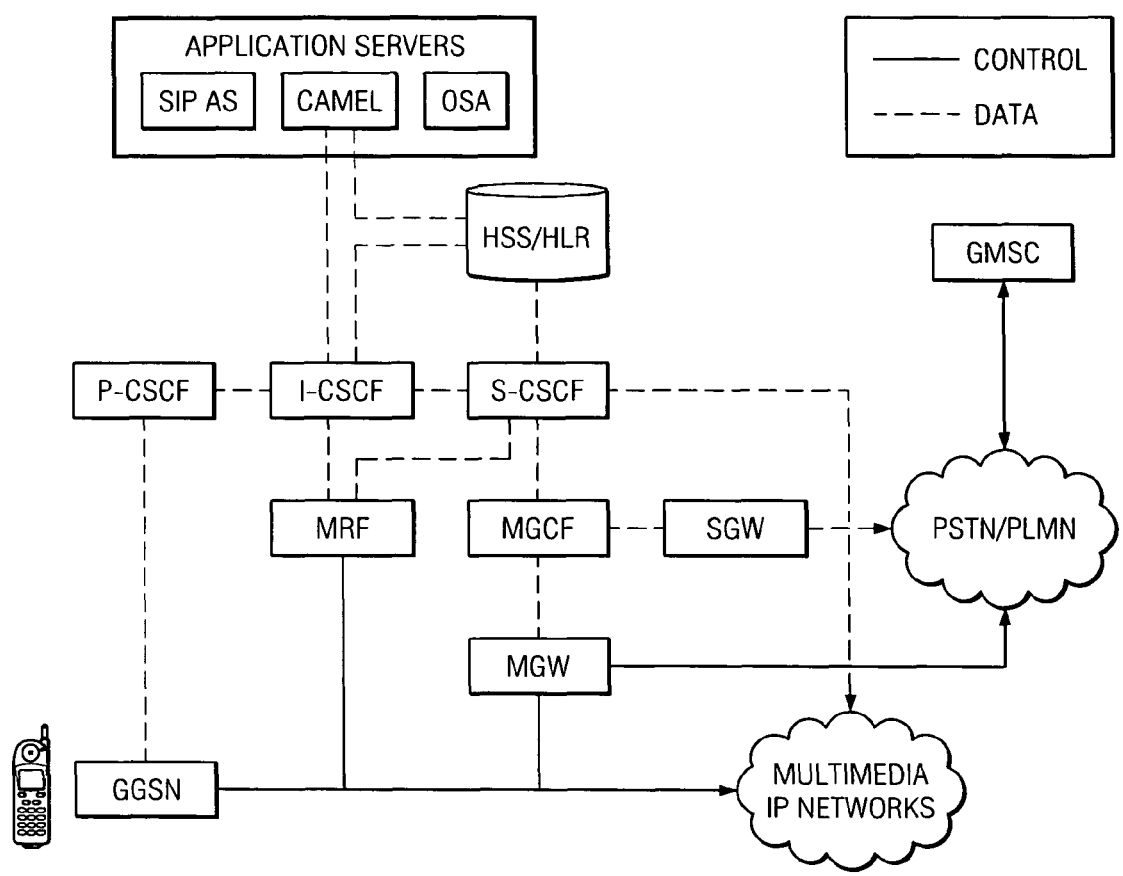
FIG. 8 illustrates a known IMS architecture as outlined in the 3GPP standards.
Figure 9:
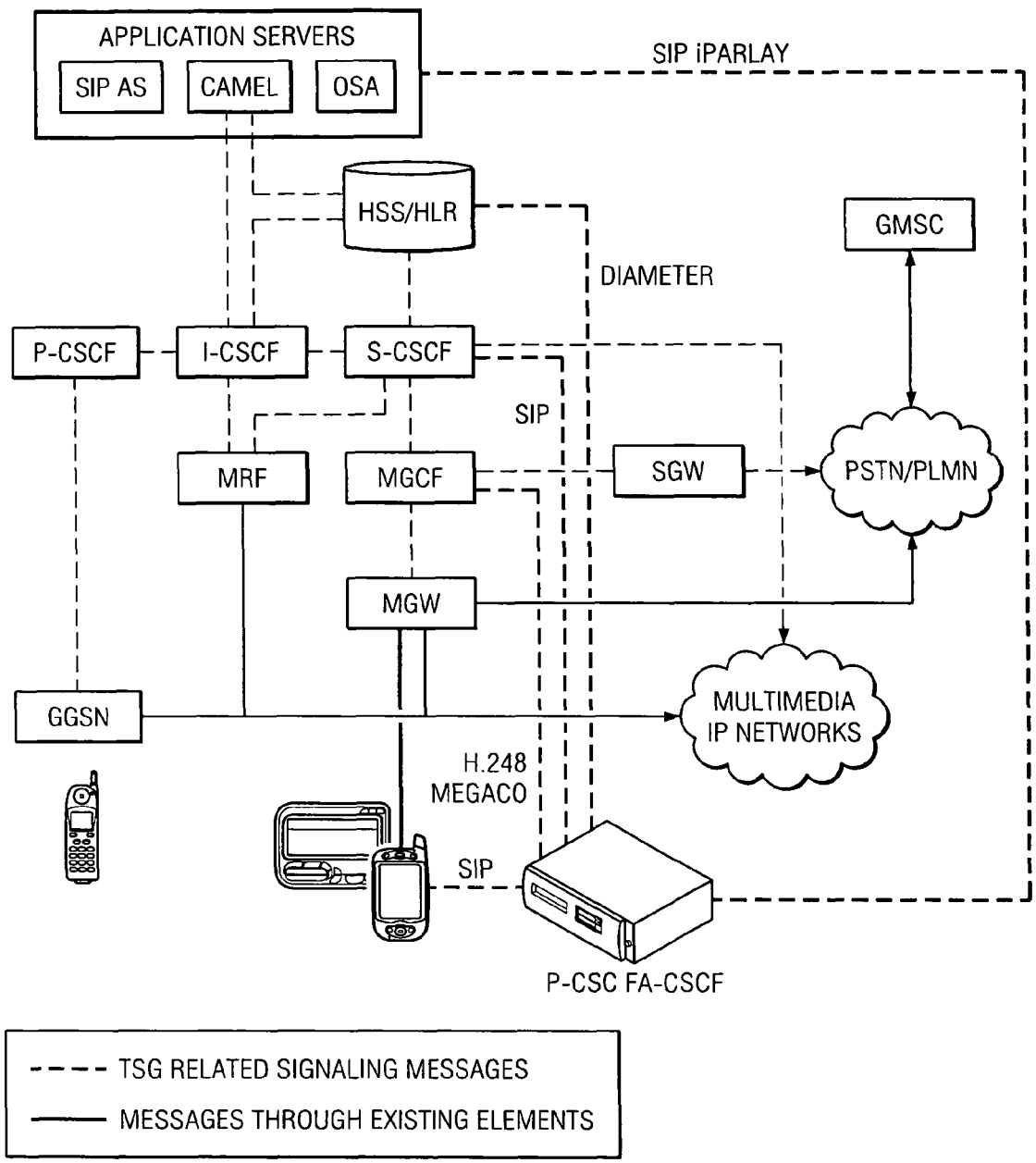
FIG. 9 illustrates an alternative embodiment showing how a subscriber gateway may be used within an IMS infrastructure for delivery of the one number voice functionality.

To highlight specific details of the IMS-based solution, FIG. 8 first illustrates an IMS architecture as outlined in the 3GPP and 3GPP2 standards (TS 23.228 and TS X.S0013). FIG. 9 illustrates how the present invention fits into this architecture in a representative embodiment. In particular, as shown in FIG. 9, the subscriber gateway preferably functions as a P-CSCF (Proxy—Call Session Control Function) that receives SIP registrations from the integrated service manager client. The subscriber gateway also optionally functions as an I-CSCF (Interrogating—Call Session Control Function) to query the HSS for subscriber information and to locate the appropriate S-CSCF (Serving—Call Session Control Function). The subscriber gateway preferably interfaces with the MGCF (Media Gateway Control Function) using H.248/Megaco protocols to establish the end-to-end call with the SIP client softphone on the client. As mentioned previously, preferably the bearer traffic between the softphone and the MGW (Media Gateway) does not go through the subscriber gateway. Finally, the subscriber gateway preferably interfaces with application servers, e.g., using SIP and Parlay, to provide the necessary interfaces into services such as Push to Talk over cellular, multiparty conferencing and messaging, and the like.

Figure 10:
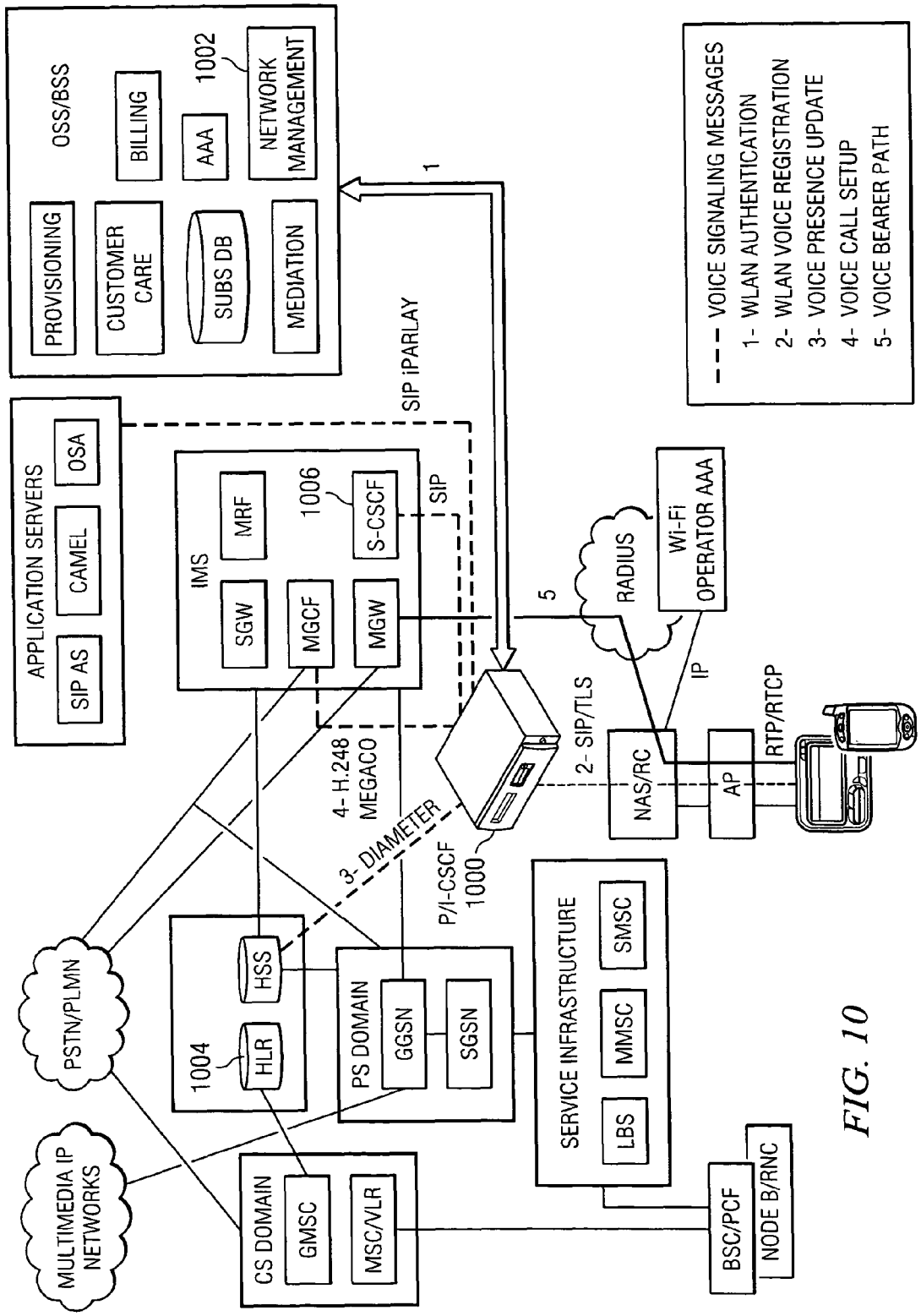
FIG. 10 provides a more detailed representation of the alternative embodiment.

FIG. 10 illustrates in more detail how the subscriber gateway fits within an IMS infrastructure for delivery of Wi-Fi voice. As shown in this figure, the gateway 1000 interfaces with an OSS/BSS infrastructure 1002 for AAA functionality. As noted above, preferably the gateway interfaces with an HLR/HSS 1004 for location update and subscriber look up. The gateway also interfaces with S-CSCF 1006 in the IMS core by functioning as a P-CSCF. As mentioned in the first (pre-IMS) embodiment, the client and gateway communicate over a SSL link, which is used for delivery of signaling and bearer traffic between the SIP endpoint and the gateway. This configuration addresses NAT and firewall traversal issues.

Figure 11:
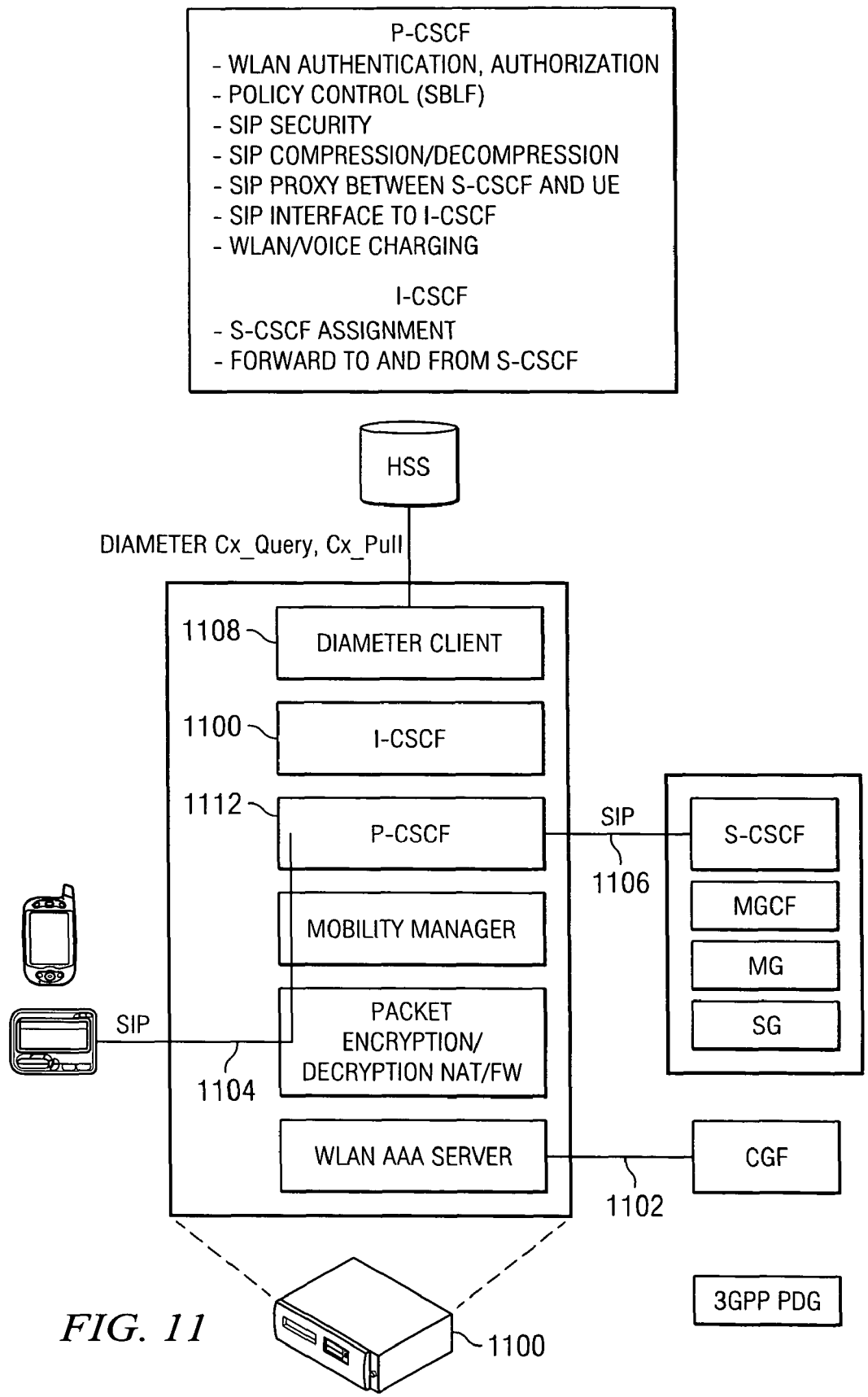
FIG. 11 is a simplified block diagram illustrating a set of software modules that comprise the subscriber gateway according to a second embodiment of the invention.

FIG. 11 provides additional details regarding the functional architecture within the subscriber gateway 1100. The AAA server 1102, PDG 1104, and mobility manager 1106 components are similar to those described in the earlier embodiment (FIG. 6). The new components in this embodiment include a DIAMETER client 1108 that interfaces with the HSS, a P-CSCF 1110, and an optional I-CSCF 1112. The components operate as follows:

In terms of the P-CSCF function 1110, the gateway performs the following functions: forwarding a SIP register request received from a UE to an I-CSCF determined using a home network domain name, as provided by the UE; forwarding SIP messages received from the UE to a SIP server (e.g. S-CSCF) whose name the P-CSCF has received as a result of the registration procedure; forwarding the SIP request or response to the UE; generating CDRs; and, maintaining a security association between itself and each UE. This latter function includes first authenticating the user with the HLR/HSS for access (using methods such as EAP SIM or EAP AKA using SIM/USIM) followed by encrypting messages between the UE and P-CSCF. The encryption preferably is achieved by using the SSL tunnel; TLS based transport can also be added, if required. Also, with respect to the P-CSCF function, the gateway performs SIP message compression/decompression, if required. In terms of the optional I-CSCF function, the gateway performs the following functions:: registration; assigning a S-CSCF to a user performing SIP registration; session-related and session-unrelated flows; routing a SIP request received from another network towards the S-CSCF; obtaining from HSS the Address of the S-CSCF; forwarding the SIP request or response to the S-CSCF determined by the step above; charging and resource utilization; generation of CDRs, and the like.

Figure 12:
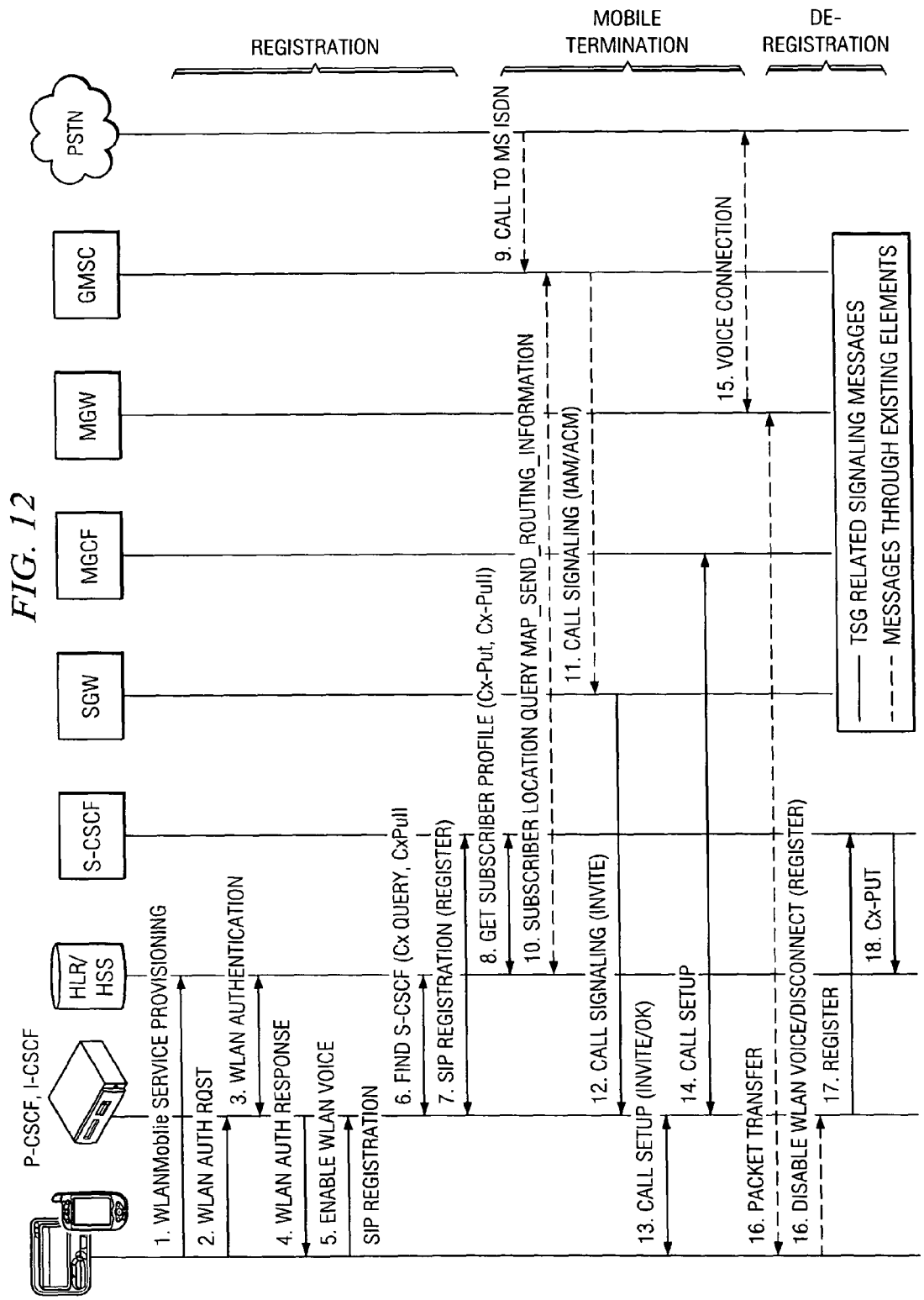
FIG. 12 is a representative call flow for the IMS-based embodiment in FIGS. 10-11.

FIG. 12 summarizes an overall call flow for the IMS based solution. This call flow is described below for a GSM network (similar messages apply to the CDMA networks):

Registration messages (steps 1 through 5 are similar to the softswitch based approach)

1. The user's client is configured with the mobile number and provisioned for Wi-Fi voice services.
2. The client makes an authentication request for Wi-Fi access.
3. The subscriber gateway authenticates the user through one of several Wi-Fi authentication methods, including SIM based authentication. Specific service authorization can also be done with the HSS using DIAMETER.
4. The authentication response is forwarded to the client.
5. The user selects "Wi-Fi voice" option from the client, requesting all future voice calls be routed to Wi-Fi. Alternatively, the Wi-Fi Voice selection can be tied to certain SSIDs or, for example, always enabled when connected from a given network. This policy can be configured through a combination of user and service provider defined preferences. The client sends the "Wi-Fi voice" message to the subscriber gateway, preferably over a secure link. The softphone on the client registers with the subscriber gateway using SIP REGISTER messages.
6. The subscriber gateway functions as an I-SCSF and queries the HSS to locate the S-SCSF for the subscriber using DIAMETER messages such as Cx_Query and Cx_Pull.
7. The subscriber gateway then functions as a P-CSCF and forwards the SIP REGISTER messages to the S-CSCF.
8. The S-CSCF then gets the subscriber profile from the HSS using messages such as Cx_Put and Cx_Pull (and functions like a VLR for the IMS network).

Mobile Terminated Calls:
9. An incoming call arrives at the GMSC.
10. The GMSC looks up the subscriber location by querying the HLR/HSS system using MAP message MAP_SEND_ROUTING_INFORMATION.
11. The GMSC sets up the call with the S-CSCF using a signaling gateway between the SS7 based CS voice network and the SIP based PS voice network. Specifically, it translates IAM messages to INVITE messages.
12. The call signaling messages are forwarded to the client through the subscriber gateway.
13. The client sets up the call through SIP INVITE messages.
14. The call is established with the incoming network.
15. The RTP/RTCP packets then go through the incoming media gateway over to the softphone through the IP network directly.

Canceling Wi-Fi Voice:
16. When the user de-selects Wi-Fi Voice or disconnects the Wi-Fi session, the client sends a Disable Wi-Fi Voice message to the subscriber gateway. The softphone may also send a de-registration message, which is essentially a REGISTER message with an expiration time of zero seconds.
17. The subscriber gateway proxies the REGISTER message to the S-CSCF.
18. The S-CSCF then sends a Cx-Put message to the HSS and the user identity is no longer considered registered in the S-CSCF. The HSS then clears the S-CSCF name for that identity.

As in the first embodiment, this approach for Wi-Fi voice also leverages the existing IMS infrastructure to deliver voice over Wi-Fi while retaining the user's identity in the mobile network. In addition, as also noted, specific billing records for Wi-Fi voice usage can also be generated by the subscriber gateway as needed.

Additional Implementation Details

As mentioned earlier, the present invention may be implemented within components commercially available from Tatara Systems, Inc. of Acton, Mass., although this is not a limitation of the present invention. The control path solution of the present invention may be implemented in any convenient manner using appropriate hardware and software components, devices, products and systems. As noted above, the control path solution provides integrated Wi-Fi authentication, presence management, voice service authorization and setup. These functions preferably are provided within the gateway, although this is not a limitation of the present invention. On the client side, a representative client typically includes a softphone capability that includes control and data path solutions—the control path preferably goes through the gateway, while the data path for sending and receiving voice packets preferably is directed to the media gateways.

Figure 13:
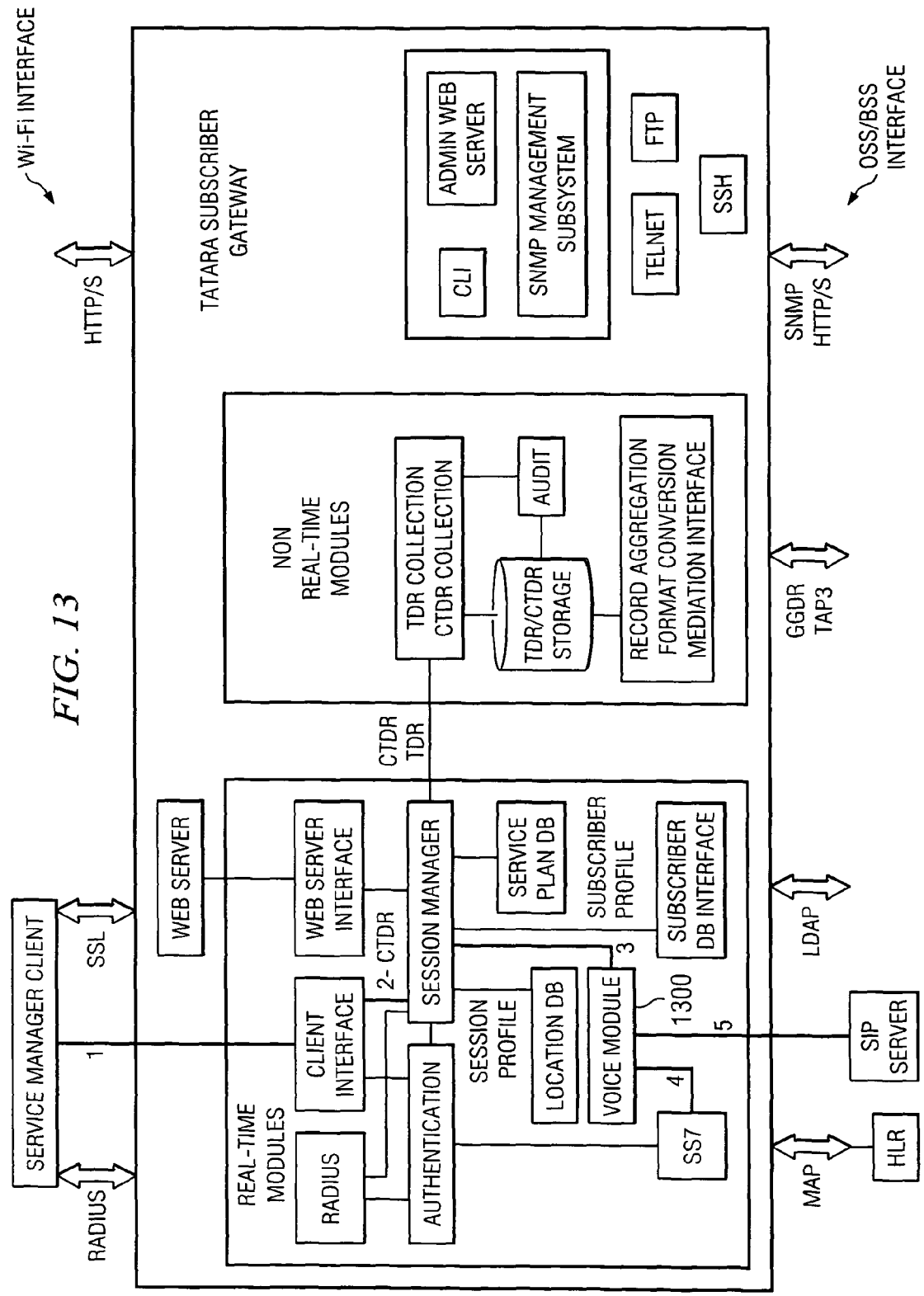
FIG. 13 illustrates a set of functional modules within a representative subscriber gateway and the specific enhancements related to the Voice Forwarding To Wi-Fi application.

FIG. 13 shows functional modules within a representative subscriber gateway and the specific enhancements related to the inventive Wi-Fi voice application. As described in copending application Ser. No. 10/871,413, the gateway preferably includes the following functional components:

Real-time modules
1. Session manager that orchestrates messages across different modules.
2. RADIUS module that interfaces with RADIUS servers and proxies within the Wi-Fi network.
3. Client module that interfaces with the clients over a secure link.
4. Web module that interfaces with a Web application for client-less authentication.
5. Authentication module that provides the authentication functionality.
6. SS7 module that sends SS7 messages to the core network.
7. Location Database that contains location data related to Wi-Fi service locations and their capabilities.
8. Subscriber Database interface that interfaces with an external subscriber database, such as LDAP.
9. Service plan database that contains information about the service plans supported for different users.

Non real-time modules include modules that collect data records, store them, audit them, and process them for delivery to other components in the service provider network. Other modules include modules for managing the gateway, such as SNMP and HTTP.

Voice Forward Related Modules

Figure 14:
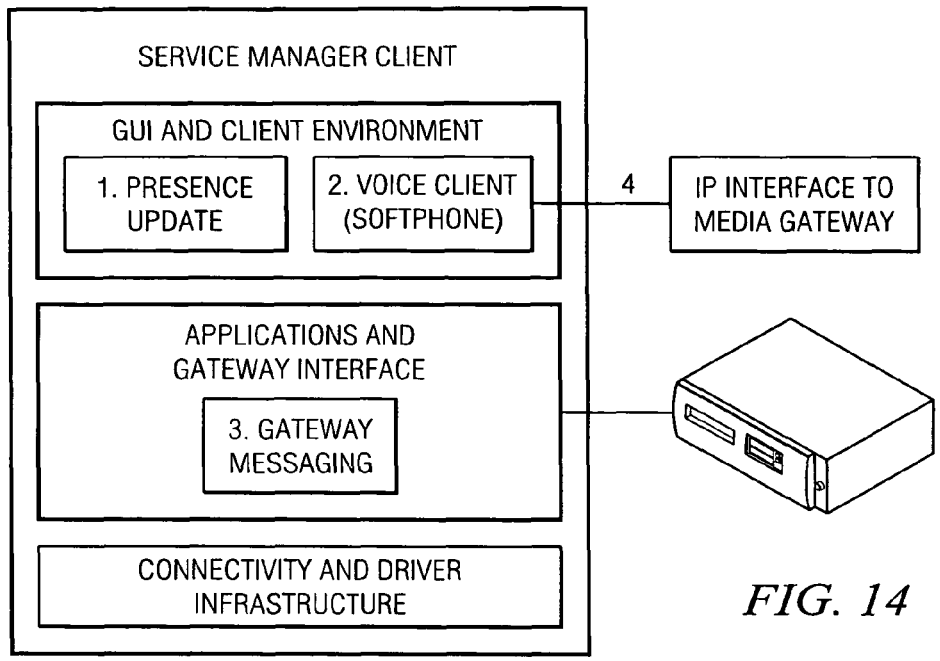
FIG. 14 illustrates a set of functional modules within a representative client and the specific enhancements related to the Voice Forwarding to Wi-Fi application.

The voice functionality preferably is provided through a voice module 1300, as shown in FIG. 13. This module interacts with other modules to provide the Wi-Fi voice functionality. In particular, a representative operation flow related to voice forward is described in the following steps using the reference numbers in FIG. 13.
1. The client sends a message to the gateway updating the user presence and status information, such as requesting Wi-Fi Voice.
2. The client interface forwards the message to a Session Manager.
3. The Session Manager maintains this information and sends a message to the voice module
4. The voice module sends a location update message to the HLR (or HSS) through the SS7 module in the case of a softswitch-based architecture. In the case of a SIP based solution, the update is sent to the SIP Server, where the voice module functions as a SIP Proxy.
5. Once location is updated, an incoming voice call signal from the softswitch or the SIP server is delivered to the voice module using SIP messages. The sequence of call setup messages is then transferred between the client and the SIP server through the voice module. The voice module functions as a SIP proxy and delivers the messages to and from the client to the SIP server. Once the call is established, the gateway sends only control messages—the data flows directly from the client to the media gateway in the network. Similarly, for outbound calls originating from the client, preferably the gateway delivers the messages between the client and the SIP infrastructure Client-Related Modules The overall structure of the client and its changes to accommodate the inventive functionality is shown in FIG. 14. As illustrated, the baseline client preferably has three major components:
1. GUI: This includes the graphical user interface capabilities related to managing the connections, status notifications, and the like.
2. Applications and Gateway interface: This component includes interfaces to other applications on the user device (e.g. VPN) as well as the secure connection into the gateway.
3. Connectivity and Driver Infrastructure: This component includes the management of the connection by interfacing with the network adaptors.

To support the voice forward functionality, several enhancements are provided to the baseline client architecture in a representative embodiment.
1. Presence update mechanism: This component is a mechanism that allows the user to update the Wi-Fi Voice status (either enable or disable). Further, this component also may be controlled by specific profiles and options. In a representative embodiment, this mechanism is button that reads "Wi-Fi Voice."
2. Voice Client: This component typically includes a softphone, which includes mechanisms to receive and send voice calls using protocols such as SIP for signaling, including address book and message management capabilities. It also provides notifications for sent and received messages.
3. Gateway messaging: This component includes messages sent between the client and the gateway to indicate user session state as well a path for signaling for call setup.
4. IP Interface to media gateway: This component is the interface for receiving actual voice call packets and goes over an IP connection to the media gateway in the voice network, without necessarily involving the subscriber gateway.

The following section provides additional details of the call flow for call origination and termination to supplement the call flows in FIG. 7 and FIG. 12. Note that the overall messages apply to the signaling between the PSTN and the SIP network and apply to both the pre-IMS (FIG. 7) as well as to the IMS based architecture (FIG. 12). In the case of an IMS network, the subscriber gateway is the P-CSCF. In a pre-IMS network, the subscriber gateway is the SIP Proxy. The S-CSCF is functionally equivalent to the SIP Server. For simplicity, these elements are referred to as the P-CSCF and the S-CSCF in the call flow description.

Mobile Originated Calls

Figure 15:
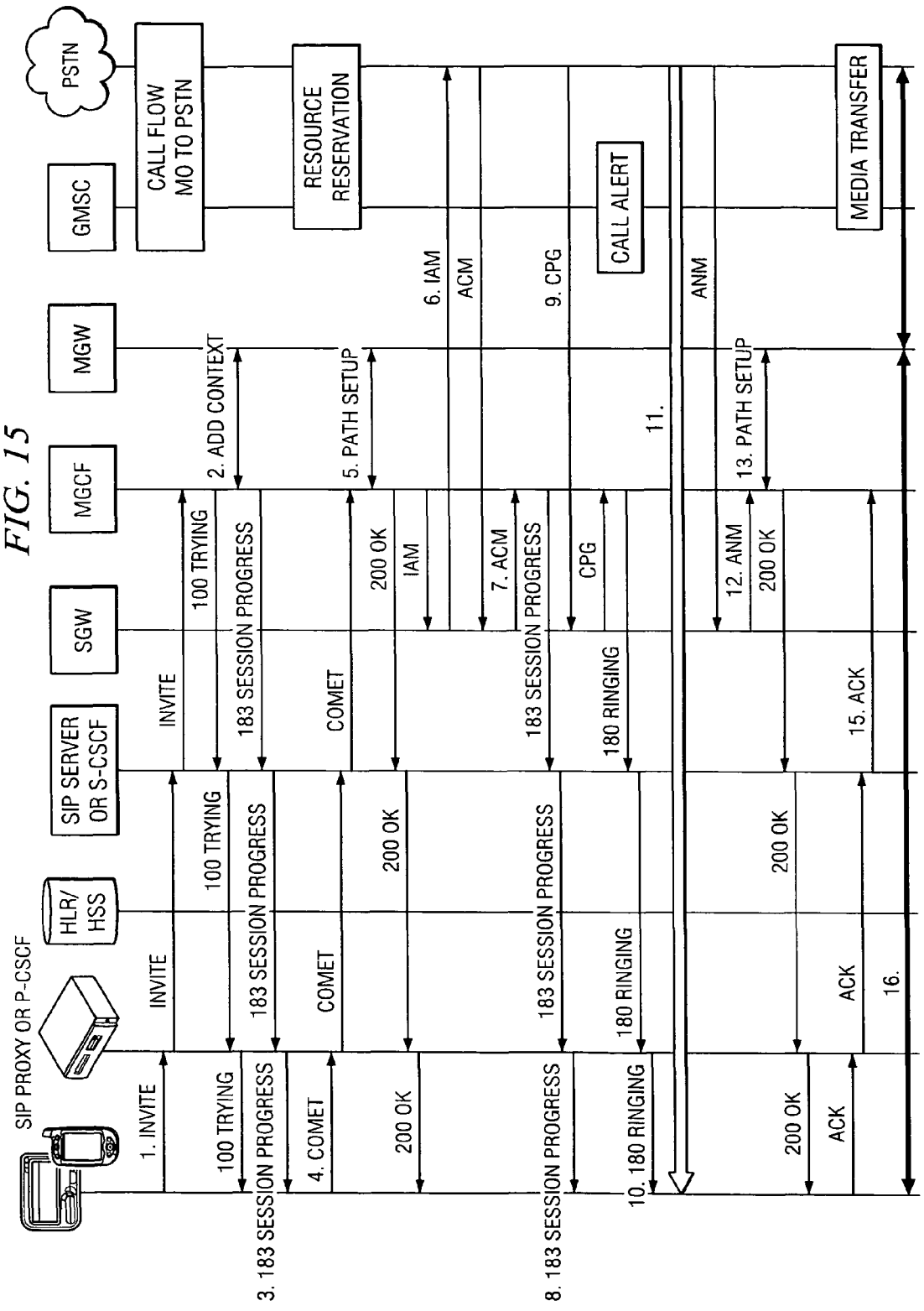
FIG. 15 shows an illustrative message exchange between the PSTN and the SIP network for a mobile originated call to the PSTN.

FIG. 15 shows the message exchange between the PSTN and the SIP network for a mobile originated call to the PSTN. This message exchange is described below.
1. The user agent (softphone) sends an INVITE message through the P-CSCF (or SIP Proxy) to the MGCF. The P-CSCF sends a 100 trying message to confirm receipt of the INVITE, forwards the INVITE to the S-CSCF. The S-CSCF confirms the receipt of the INVITE by replying with a 100 trying message. The S-CSCF determines that the call is destined for the PSTN and routes the INVITE to the appropriate MGCF.
2. The MGCF responds with a 100 trying message and then configures the MGW for the speech path. (Details of the MGCF and MGW communication are not shown here.). The MGCF uses H.248/Megaco protocol messages to add a new IP termination to the IM side of the MGW with the Add command. The MGW creates a new context for the connection.
3. The MGCF sends a 183 session progress message back to the UE via the signaling path, indicating that the precondition for the session can be met by the MGW.
4. The UE receives the 183 session progress message and confirms that the speech path is reserved by sending a COMET message back to the MGCF along the signaling path.
5. On receiving the COMET message, the MGCF now knows that the speech paths have been reserved and modifies the speech path termination on the MGW so that the backward path from the PSTN to the UE is switched through so that the mobile can get the tones and announcements from the UE. The MGCF then acknowledges the COMET with a 200 OK which can contain details of the IP termination in the MGW.
6. The MGCF initiates a call establishment to the PSTN by sending an IAM (Initial Address Message) to the SGW. The SGW relays the message from the IP protocol to the SS7 MTP message to the PSTN entry point.
7. The PSTN accepts the call with an ACM (Address Complete Message), which is sent back to the MGCF via the MGW.
8. The MGCF sends a 183 session progress back to the US through the signaling path containing description of the one may packets that may be received by the UE.
9. The PSTN then sends a CPG (Call Progress Message) to the SGW, indicating that the called telephone is ringing. This is accompanied by a in-band ring tone to the caller.
10. The SGW relays this 180 ringing message to the user via the signaling path.
11. The call alert is sent to the user
12. When the call is answered, the PSTN sends an ANM (Answer Message) to the SGW, which it relays to the MGCF.
13. At this point, the MGCF issues another modify command to the IP path in the MGW to allow both speech paths to be switched through.
14. The MGCF then sends a 200 OK message back to the UE following the signaling path.
15. The UE sends back an acknowledgement of the call establishment via an ACK message.
16. The speech path then goes through the MGW to the UE.

Mobile Terminated Calls

Figure 16:
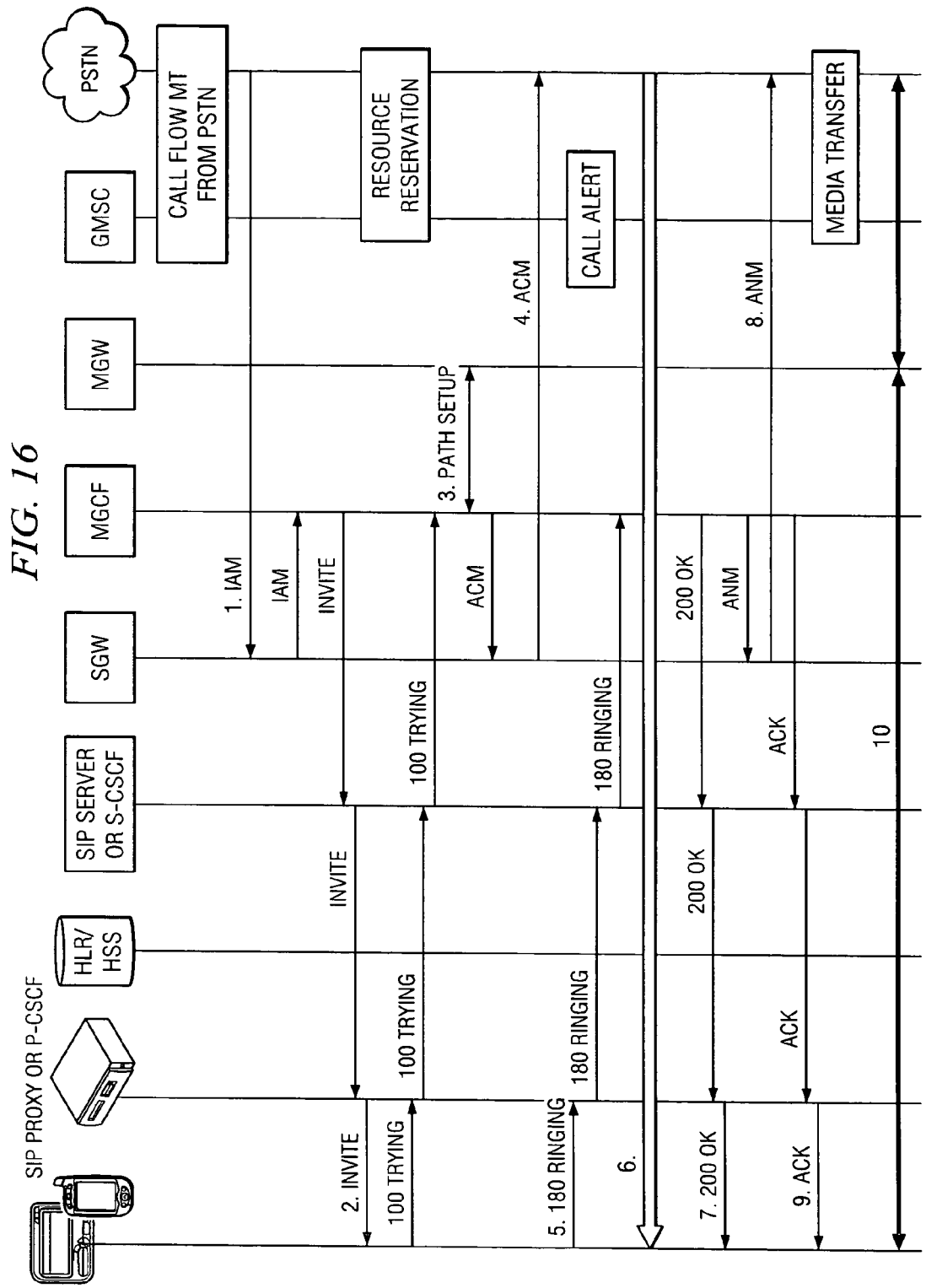
FIG. 16 shows an illustrative message exchange procedure for a mobile terminated call.

The procedure for the Mobile Terminated call is similar and is illustrated in FIG. 16 and described below.
1. The incoming call from the PSTN arrives at the MGCF through the SGW and via an IAM message.
2. The MGCF sends an INVITE to the UE through the SIP Signaling path. The UE responds with a 100 trying message.
3. The MGCF establishes a one way path in the MGW for the call alert messages to go through.
4. The PSTN responds with a ACM message, which is routed from the SGW to the MGCF.
5. The UE responds with a ringing message.
6. The call alert is sent through.
7. The MGCF sends a 200 OK message to the UE to indicate that the session parameters are met.
8. When the destination party answers, the MGCF forwards an ANM message to the PSTN.
9. The MGCF acknowledges the final SIP response with a SIP ACK message, 10. The call is now set up and the media transfer is established between the UE and the MGW.

Figure 17:
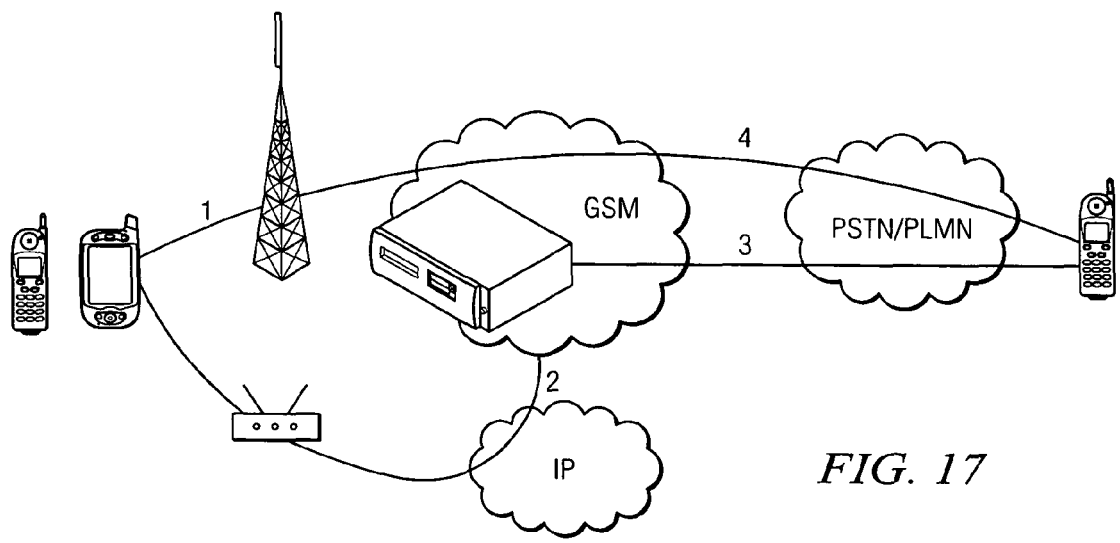
FIG. 17 illustrates an GSM to WiFi handoff that may be implemented in conjunction with the present invention.
Figure 18:
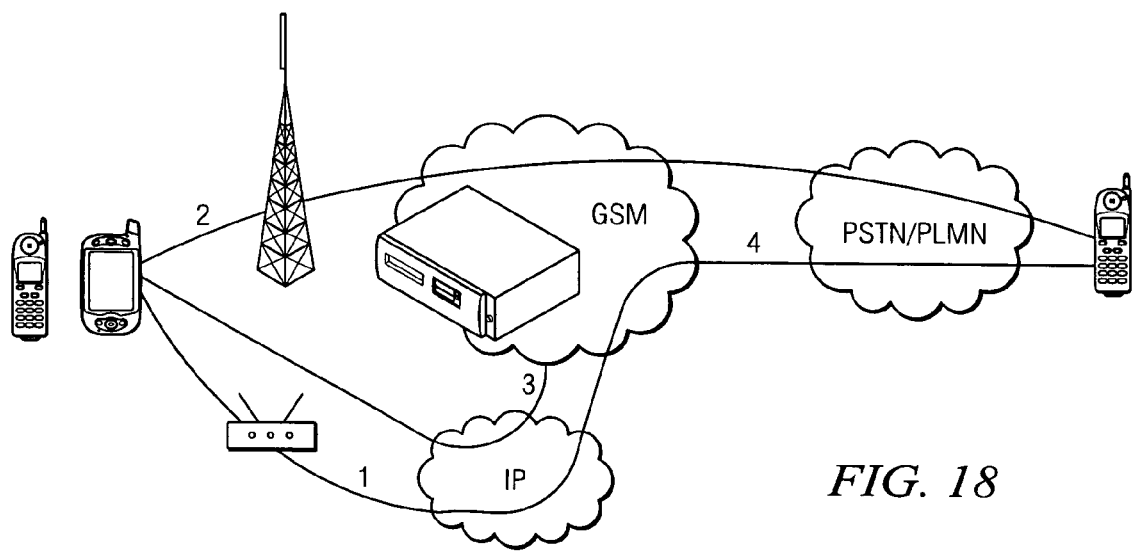
FIG. 18 illustrates a WiFi to GSM handoff that may be implemented in conjunction with the present invention.

As multi-mode devices start becoming more prevalent, the above-described voice forwarding solutions may be modified to support voice handoff across GSM and Wi-Fi networks. To this end, it is assumed that such a device comprises (either as original equipment or as a software download) appropriate client functionality as has been described generally above. The handoff between the GSM and Wi-Fi networks may be implemented using multiparty calling capabilities. As shown in FIG. 17, for example, as the user moves from the GSM network to the Wi-Fi network, the user is first authenticated for Wi-Fi access, and then the Wi-Fi call is established as a conference call. Once the Wi-Fi leg is established, the GSM leg is disconnected. In like manner, a Wi-Fi to GSM handoff process is shown in FIG. 18, which uses the same approach.

One of ordinary skill in the art will appreciate that the present invention provides numerous advantages. The inventive service provides unique value to the subscriber as well as to the service provider. Subscribers benefit because they get to maintain a single identity for all voice applications. A subscriber can always be reached on his or her existing mobile phone number, regardless of the network and device the subscriber connects from. While Wi-Fi VOIP may not be expected to be a primary voice connection, it provides a good alternative when there is lack of cellular coverage, when roaming charges are high, or simply when the subscriber cannot use his or her cell phone (e.g. battery dead, usage policies, etc.). Also, as multi-mode devices become more prevalent, the user experience of such a converged voice service also improves. Service providers also benefit from such a service and can leverage it both as an opportunity as well as to prevent cannibalization of their existing services. From an opportunity perspective, service providers benefit because they can provide voice services even in the home environment and potentially get additional service usage previously targeted for wireline use. Second, service providers can also use this service to address coverage concerns in homes or other areas. Further, in heavy usage settings such as convention centers, service providers can use Wi-Fi voice as a way to selectively off-load traffic to the Wi-Fi network, e.g., to address capacity concerns.

Although an illustrative embodiment involves Voice Forwarding to Wi-Fi, this is not a limitation, as the techniques of the present invention can also be used to forward voice to any IP network, such as Wi-Max, Ethernet connections, or the like. More generally, the present invention describes a technique whereby a user's identity in a service provider's telecommunications network (e.g., an MSISDN number) is transported or bridged across various different networks and/or devices to facilitate voice communications using just that one identity. Thus, in one above-described embodiment, the device is a laptop having a Wi-Fi card, and the user can receive (or place) telephone calls to his or her mobile number at (or from) that device. In another embodiment, the device is a dual mode cellphone having a first interface to the user's mobile service provider's network, and a second interface to some other network, such as a WLAN. There is no requirement that the device at which the user's identity is transported or bridged be a mobile device, although this will be the case typically. Indeed, that device may be a home PC. In another embodiment, the device is a cellphone that uses one telecommunications standard in one network (e.g., CDMA in Europe) and a second standard in another network (e.g., GSM in the U.S.). These are merely representative examples, of course.

Although not illustrated in detail, one of ordinary skill will also appreciate that the subscriber gateway enables access to advanced IMS services over WLAN by interfacing with existing application servers. This may be accomplished over standard interfaces, such as SIP and Parlay. These services include extension of IMS services into the WLAN network (e.g., push-to-talk, conferencing, and the like), as well as creation of WLAN specific applications by third party application developers, e.g., by using state information exported by the Subscriber Gateway. The Voice Forwarding to Wi-Fi functionality of the present invention may be implemented as one such WLAN specific application.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

While given components of the system have been described separately, one of ordinary skill also will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows

GLOSSARY

The following is a glossary of some of the terms used in this written description or used in the accompanying drawings.

GMSC refers to a Gateway Mobile Switching Center;

GPRS refers to the General Packet Radio Service, which is a data technology for GSM networks;

MSISDN means mobile subscriber ISDN number, which is the number used to call a mobile subscriber;

SIP refers to the Session Initiation Protocol (SIP), which is a signaling protocol for Internet conferencing, telephony, presence, events notification and instant messaging;

HLR refers to the Home Location Register, a database to which a subscriber's identity is assigned for record and billing purposes;

PSTN refers to the Public Switched Telephone Network;

IMS refers to an Internet Protocol (IP) Multimedia Subsystem, which provides signaling to control real time multimedia services for a packet domain in Universal Mobile Telecommunications System (UMTS) and CDMA networks and allows for smooth integration of new IP-based services. IMS defines a set of components: a Call Session Control Function (CSCF)—which acts as Proxy CSCF (P-CSCF) in a visited network, a Serving CSCF (S-CSCF) in a home network or Interrogating CSCF (I-CSCF) in a home network—to route and control session establishment; a Media Gateway Control Function (MGCF), which controls a Media Gateway and performs protocol conversion between ISUP and SIP; a Media Gateway (MGW), which interacts with MGCF for resource control, a Multimedia Resource Function (MRF), which controls media stream resources; a Breakout Gateway Control Function (BGCF), which selects the network in which PSTN breakout is to occur; and Application Servers, (AS), which offers value added services;

IMSI refers to an International Mobile Subscriber Identity, which is a number that uniquely identifying a GSM subscriber. The number typically contains two parts, a first part that identifies the GSM network operator with whom the subscriber has an account. The second part of the number is allocated by the network operator to identify uniquely the subscriber. IMSI=MCC+MNC+MSIN (HLR+SN).

RADIUS is an IETF-defined client/server protocol and software that enables remote access servers to communicate with a central server to authenticate dial-in users and authorize their access to the requested system or service;

WLAN refers to a wireless local area network, typically based on IEEE 802.11 technology.

GGSN refers to a Gateway GPRS Support Node, which is a node in a GPRS infrastructure that provides a router for delivering data services on a wireless network;

SGSN refers to a Serving GPRS Support Node, which is a node in a GPRS infrastructure that is responsible for the delivery of data packets from and to the mobile stations within its service area;

AAA refers to systems, devices, hardware and/or software that provide authentication, authorization and accounting functions;

OSA refers to Open Service Access, which is a standardized interface used by an application to access service capability features; and CAMEL refers to Customized Application for Mobile Network Enhanced Logic;

PLMN refers to a Public Land Mobile Network;

MSC refers to a Mobile Switching Center, which is typically an interface between a base station system and a switching subsystem of a mobile phone network;

VLR refers to a Visitor Location Register, a local database function that maintains temporary records associated with individual subscribers.

SMSC is a network element in a mobile telephone network that delivers SMS messages; the machine(s) within a wireless service provider's network that provides the routing of all SMS or text messages. Like an email server, the SMSC handles large volumes of messages sent between two mobile phones or a mobile phone and a software application. An SMS internetworking MSC (SMS-IWMSC) is an MSC capable of receiving a short message from the mobile network and submitting it to a given SMSC.

Having described my invention, what I now claim is as follows.

The invention claimed is:

1. A method of communicating voice within a converged networking operating environment wherein a gateway is deployed in a service provider's telecommunications network and client software is embedded in a target device that is operable within both the telecommunications network and a second network to which the target device is connectable, the service provider's telecommunications network having a set of one or more network elements that comprise or are associated with a voice over IP infrastructure, and a home location register (HLR) to which a subscriber's identity is assigned, and wherein a connection is established between the client software and the gateway, the subscriber having a mobile telephone number, the method comprising:

authenticating the client software to provide a voice forwarding service;

following authentication, and responsive to receipt at the gateway of a Session Initiation Protocol (SIP) registration message from the target device, converting the SIP registration message into a message that updates given information in the HLR to identify the gateway as a location of the target device when the target device is connected to the second network, wherein after updating the given information in the HLR the gateway acts as a visitor location register (VLR);

routing voice calls received to the mobile telephone number over the voice over IP infrastructure to the target device without using a number or identity associated with the second network; and routing voice calls initiated by the target device over the voice over IP infrastructure, wherein the initiated voice calls appear as if originating from the mobile telephone number instead of a number or identity associated with the second network.

2. The method as described in claim 1 wherein the voice forwarding service is automatically enabled for a given telecommunications network.

3. The method as described in claim 1 wherein the voice forwarding service is manually enabled.

4. The method as described in claim 1 wherein the mobile telephone number is associated with a software-based IP telephone.

* * * * *